(12) United States Patent
Conan et al.

(10) Patent No.: US 10,841,639 B2
(45) Date of Patent: Nov. 17, 2020

(54) NAVIGATION AROUND USER DATA

(71) Applicant: ORANGE, Paris (FR)

(72) Inventors: Martin Conan, Chatillon (FR); Jean-Bernard Leduby, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/464,917

(22) PCT Filed: Nov. 29, 2017

(86) PCT No.: PCT/FR2017/053284
§ 371 (c)(1),
(2) Date: May 29, 2019

(87) PCT Pub. No.: WO2018/100289
PCT Pub. Date: Jun. 7, 2018

(65) Prior Publication Data
US 2020/0014968 A1    Jan. 9, 2020

(30) Foreign Application Priority Data

Nov. 30, 2016 (FR) .................................. 16 61716

(51) Int. Cl.
*H04N 21/422* (2011.01)
*G06F 3/01* (2006.01)
(Continued)

(52) U.S. Cl.
CPC ....... *H04N 21/42222* (2013.01); *G06F 3/017* (2013.01); *G06F 3/0346* (2013.01);
(Continued)

(58) Field of Classification Search
CPC ....... H04N 21/42222; H04N 21/42221; H04N 21/4223; H04N 21/4821; G06F 3/017; G06F 3/0346
See application file for complete search history.

(56) References Cited

U.S. PATENT DOCUMENTS 9,223,416 B2    12/2015 Choi et al.
2007/0058047 A1*  3/2007 Henty ................ H04N 5/44582
                                                  348/211.99
(Continued)

FOREIGN PATENT DOCUMENTS

| EP | 2241964 A2 | 10/2010 |
| FR | 2982722 A3 | 5/2013 |
| WO | 2016076568 A1 | 5/2016 |

OTHER PUBLICATIONS

International Preliminary Report on Patentability and English translation of the Written Opinion dated Jun. 4, 2019 for corresponding International Application No. PCT/FR2017/053284, filed Nov. 29, 2017.

(Continued)

*Primary Examiner* — John R Schnurr
(74) *Attorney, Agent, or Firm* — David D. Brush; Westman, Champlin & Koehler, P.A.

(57) ABSTRACT

A processing method for a processing device associated with a retrieval device. The processing device is driven by a control device and is able to control the retrieval of data on the retrieval device. The method includes, on the processing device, the following steps: receiving data to be retrieved on the retrieval device; obtaining a motion information item originating from the control device; and processing the data to be retrieved as a function of the motion information item received, independently of an initial position.

9 Claims, 2 Drawing Sheets

(51) Int. Cl.
  *G06F 3/0346* (2013.01)
  *H04N 21/4223* (2011.01)
  *H04N 21/482* (2011.01)
(52) U.S. Cl.
  CPC ... *H04N 21/4223* (2013.01); *H04N 21/42221* (2013.01); *H04N 21/4821* (2013.01)

(56) References Cited

U.S. PATENT DOCUMENTS

| | | | | |
|---|---|---|---|---|
| 2010/0118209 | A1* | 5/2010 | Hardacker | G08C 23/04 348/734 |
| 2013/0321309 | A1* | 12/2013 | Tokutake | H04N 21/42222 345/173 |
| 2014/0150026 | A1* | 5/2014 | Mountain | G06F 3/017 725/52 |
| 2015/0199899 | A1* | 7/2015 | Tanaka | G08C 17/02 340/12.5 |
| 2016/0066011 | A1* | 3/2016 | Ro | H04N 21/4312 725/38 |
| 2017/0256160 | A1* | 9/2017 | Zhang | G08C 17/02 |

OTHER PUBLICATIONS

International Search Report dated Feb. 21, 2018 for corresponding International Application No. PCT/FR2017/053284, filed Nov. 29, 2017.

Written Opinion of the International Searching Authority dated Feb. 21, 2018 for corresponding International Application No. PCT/FR2017/053284, filed Nov. 29, 2017.

* cited by examiner

NAVIGATION AROUND USER DATA

CROSS-REFERENCE TO RELATED APPLICATIONS

This Application is a Section 371 National Stage Application of International Application No. PCT/FR2017/053284, filed Nov. 29, 2017, which is incorporated by reference in its entirety and published as WO 2018/100289 A1 on Jun. 7, 2018, not in English.

TECHNICAL FIELD

The invention relates to a control device linked to a data rendering device.

The invention relates in particular to the control of the navigation in the data rendered by the rendering device.

STATE OF THE ART

Recently, new control modes for controlling audiovisual appliances, in particular for control of TV programme schedules, also called navigation in the programme schedule.

The means of navigating generally consists in using the direction arrows of the remote control, in particular using the P+ and P− buttons to navigate, or "zap", very simply between the audiovisual channels proposed in the schedule. This content-based navigation mode uses only a very small proportion of the capabilities of the remote control and of the programme schedule.

Also known are methods which make it possible to simulate a pointing device to move around on the screen and select previously defined objects, as if using the mouse of a computer, the remote control serving as the mouse, and the television, or the set top box associated with the television, acting as the computer. The French certificate application entitled number 1350477 from the company Samsung describes, for example, a gesture mode associated with a remote control device in which the motion information from the remote control makes it possible to select then move an object proposed on the user interface screen of the television.

This type of solution is however unnatural for the user. Typically, such remote control devices require the user to make a selection of an object displayed on the screen. The device converts the position acquired from the remote control into a point used subsequently to interact with the object on the screen (list item, pictogram, etc.). If this point does not accurately correspond to the position of a "pointable" object, it cannot be taken into account. Subsequently, a motion of the remote control can be used to move the object that is pointed to. This restricts the user to a pointing with his or her gesture tracked with very high accuracy. In addition, this type of mechanism is limited to a display composed of objects (and not of natural images).

The invention offers a solution that does not present the drawbacks of the state of the art.

The Invention

To this end, according to a functional aspect, the subject of the invention is a processing method for a processing device associated with a rendering, said processing device being driven by a control device and being capable of controlling the rendering of data on the rendering device, the method comprising, on the processing device, the steps of:
reception of data to be rendered on the rendering device;
obtaining of motion information from the control device;
processing of the data to be rendered as a function of the motion information received, independently of an initial position.

"Data to be rendered" is understood to mean any type of data which can be rendered on the rendering device (text, images, video, sound, etc.), for example a user interface (also called HMI, for Human-Machine Interface), that is to say all of the information and hardware and software mechanisms allowing a user to communicate with the processing device. Here, it can be equally, a text interface (using semi-graphic characters to display menus, dialog boxes, messages, or any other item intended for the user), a graphical interface (for which the objects to be manipulated are presented in the form of pictograms on which the user can imitate physical manipulations), a web type interface (a graphical interface of a web application, manipulated using a web browser), or even a voice interface, etc.

"Control device" is understood to mean a device capable of controlling the rendering device. It can be remote (remote control) or not.

"Rendering device" is understood to mean a device such as a display device or a sound rendering device, for example a television equipped with a screen and loudspeakers for rendering audiovisual data, text, images, videos, sound or the like.

"Processing device" is understood to mean a device capable of receiving data to be rendered and of transmitting them to a rendering device. The processing device and the rendering device can be merged (in the case of a connected television, for example) or distinct, as, for example, in the case of a set top box provided to operate in cooperation with an external television.

"Motion information" is understood to mean any information representative of the motion of the user, more particularly his or her hand, in space. It is recalled that, conventionally, the motion of a solid can be characterized by a set of vectors associated with said solid (position, speed, acceleration vectors). For example, in the context addressed here, it can be a circular, translational or other such motion accompanied by a speed and an acceleration, uniform or not.

"Processing data to be rendered" is understood here to mean any manipulation of the data in order to manage the rendering thereof, in particular the display thereof (images, text, video, etc.). The processing being a function of the motion obtained from the user, it makes it possible in this context to modify the rendering of the data: movement on the screen to the left or to the right (corresponding for example to the horizontal scrolling of a menu), up or down (corresponding for example to the vertical scrolling of a menu), zoom (corresponding for example to the enlargement of a menu), rotation (for example of an object displayed on the screen, of an image, of a menu, etc.), increasing of the sound volume, etc.

"Initial position" is understood to mean a position which would be selected on the screen before the start of the processing.

Advantageously according to the invention, the rendering of the data, for example the display thereof on the screen, is not therefore dependent on a selection device on the screen. To move the display, it is sufficient for the user to perform a motion (of the hand). It is not necessary to select a zone or a specific object before initiating the motion. Only the motion of the user, who is for example holding a remote control, determines the modifications of the data rendered on the screen, independently of any pointing. In other words, there is no need to point to an object or a zone of the screen to be able to control it. The initial position of the remote control (or of the hand of the user in the case of a control device associated with a camera) is unimportant, only the motion is taken into account by the method according to the invention. Thus, in the abovementioned example, the fact that the user "points" to the top or the bottom of the screen (with his or her hand or his or her remote control) is unimportant: the act of performing, for example, a downward translational motion will result in the movement of the rendered data toward the bottom of the screen.

In particular, the subject of the invention is therefore a processing method for a processing device associated with a rendering device, said processing device being driven by a control device and being capable of controlling the rendering of user interface data on the rendering device, said user interface being capable of scrolling horizontally and/or vertically, the method comprising, on the processing device, the steps of:

reception of user interface data to be rendered on the rendering device;
obtaining of motion information from the control device;
controlling of scrolling of the data to be rendered as a function of the motion information received, independently of a pointing action.

According to a particular implementation of the invention, a method as described above is characterized in that the control device is a remote control communicating with the processing device via a wireless link.

Advantageously according to this embodiment, the control device can conventionally take the form of a remote control of the set top box associated with a television (such a set top box can be internal or external to the television), but could also consist, in the context of the invention, of a very simple device attached for example to the finger, to the wrist, etc. of the user, provided that it can record and transmit a motion command to the processing device. The remote control therefore in this case constitutes a kind of natural extension of the hand of the user.

According to another particular implementation of the invention, which will be able to be implemented alternatively or together with the preceding one, a method as described above is characterized in that the control device comprises at least one camera capable of recording the motions of the user.

The control device can comprise one or more cameras capable of detecting the motion of a user, in particular the motion of his or her hand in space. In this case, the control device associated with the cameras, capable of communicating with the processing device to transmit the motion of the user to it, is located for example in the set top box, or in the television, thus freeing the user to carry a remote control, since it is sufficient for him or her to move the hand freely in space.

According to another particular implementation of the invention, which will be able to be implemented alternatively or together with the preceding ones, a method as described above is further characterized in that the data to be rendered are graphical interface data, the motion comprises a translation and the control is a scrolling control in the graphical interface.

This implementation of the invention makes it possible to advantageously manage the graphical interfaces, such as the menus for example in a natural and simple manner for the user.

According to another particular implementation of the invention, which can be implemented alternatively or together with the preceding ones, a method as described above is further characterized in that the data to be rendered are video data and the control is a control of movement of the video data rendered.

This implementation of the invention makes it possible to advantageously manage the television transmissions displayed on the screen: indeed, by virtue of the invention, it is sufficient for the user, once the program is rendered (film, TV broadcast, etc.), to move his or her hand in space to move the display of the video on the screen. If the audiovisual program is designed appropriately, the user will thus be able, quite naturally, to move the graphical scene to display new data. In particular, it will thus be possible for him or her to simulate a translation, rotation, etc. of the graphic scene.

According to another particular implementation of the invention, which will be able to be implemented alternatively or together with the preceding ones, a method as described is further characterized in that the data to be rendered are data from a video channel and the control is a channel change control.

This embodiment can advantageously make it possible to simulate a navigation in the channels by "P+" and "P−" buttons by processing a certain type of motion (for example a translation to the right) as a "P+" control and another (for example a translation to the left) as a "P−" control causing the anticipated change of channel.

According to another particular implementation of the invention, which will be able to be implemented alternatively or together with the preceding ones, a method as described is further characterized in that the obtaining of the motion comprises:

the obtaining of a first motion in a first direction;
the obtaining of a second successive motion in a second direction different from the first,
and in that it comprises a step of modification of the processing when the second motion is detected.

Advantageously according to this embodiment, the detection of a second motion of the hand of the user (for example a horizontal motion) stops a first processing (the scrolling of the menu or of the video driven by a vertical motion of the hand of the user) to link to another action (selection of a program, increasing of the sound volume, etc.)

According to a hardware aspect, the invention relates also to a processing device associated with a rendering device, the processing device comprising:

a reception module capable of receiving data to be rendered on the rendering device;
an obtaining module capable of receiving motion information from a control device;
a processing module configured to process said control and render said data to be rendered on the rendering means as a function of the motion information received, independently of an initial position.

The term "module" can correspond equally to a software component and to a hardware component or a set of hardware and software components, a software component itself corresponding to one or more computer programs or subprograms or, more generally, to any element of a program capable of implementing a function or a set of functions as described for the modules concerned. Likewise, a hardware component corresponds to any element of a hardware assembly (or hardware) capable of implementing a function or a set of functions for the module concerned (integrated circuit, chip card, memory card, etc.)

According to another hardware aspect, the invention relates also to a control device capable of supplying motion information for a processing device associated with a rendering device, the control device comprising:

a detection module intended to detect motion information from the control device;

a communication module capable of transmitting the motion information to the processing device;

According to another hardware aspect, the invention relates also to a system composed of a processing device as described previously and of a control device as described previously.

According to another hardware aspect, the invention relates also to a computer program capable of being implemented in a processing device as defined above, the program comprising code instructions which, when the program is executed by a processor, performs the steps of the processing method as described previously.

This processing device and this computer program offer features and advantages similar to those described previously in relation to the processing method.

This program can use any programming language, and be in the form of source code, object code, or intermediate code between the source code and object code, such as in a partially compiled form, or in an any other desirable form.

According to yet another hardware aspect, the invention deals with a storage medium that can be read by a data processor on which is stored a program comprising program code instructions for the execution of the steps of the method defined above. The information medium can be any entity or device capable of storing the program. For example, the medium can comprise a storage means, such as a ROM, for example a CD ROM or a microelectronic circuit ROM, or even a magnetic storage means, for example a diskette (floppy disk) or a hard disk. On the other hand, the information medium can be a transmissible medium such as an electrical or optical signal, which can be routed via an electrical or optical cable, wirelessly or by other means. The program according to the invention can in particular be downloaded over a network of Internet type. Alternatively, the information medium can be an integrated circuit in which the program is incorporated, the circuit being adapted to execute or to be used in the execution of the method concerned.

The invention will be better understood on reading the following description, given by way of example and with reference to the attached drawings.

THE FIGURES

Figure 4:
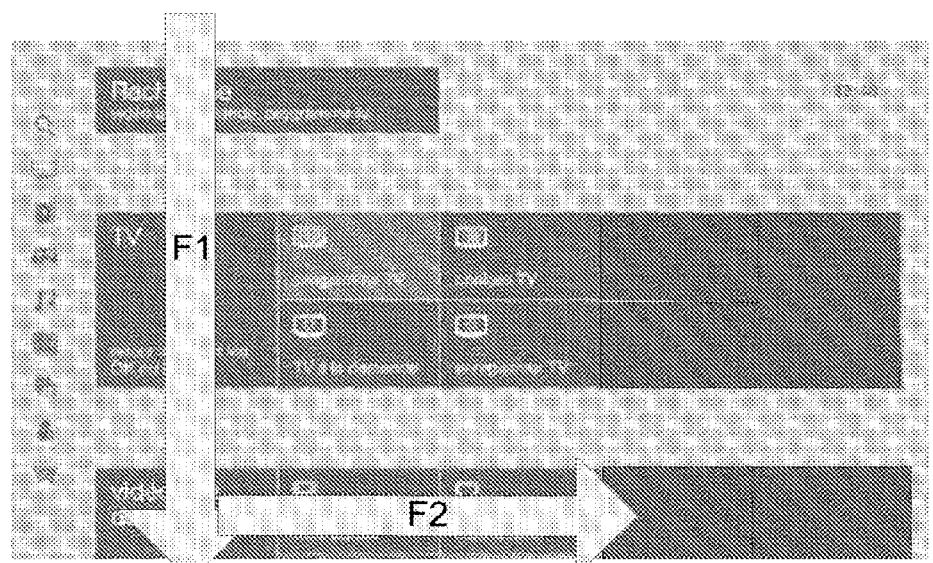

FIG. 4 graphically illustrates an example of use of the motion for navigation in a programme guide, according to an embodiment of the invention.

Figure 5:
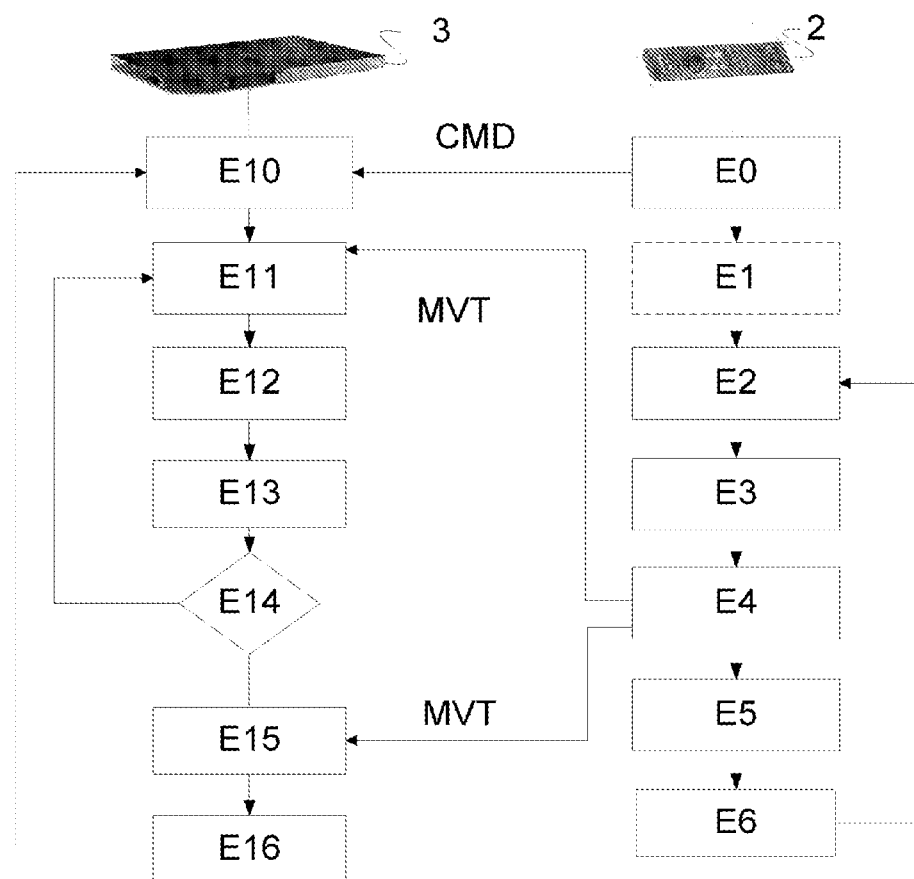

FIG. 5 illustrates a flow diagram of the different steps of the method according to an embodiment of the invention.

DETAILED DESCRIPTION OF AN EXEMPLARY EMBODIMENT ILLUSTRATING THE INVENTION

Figure 1:
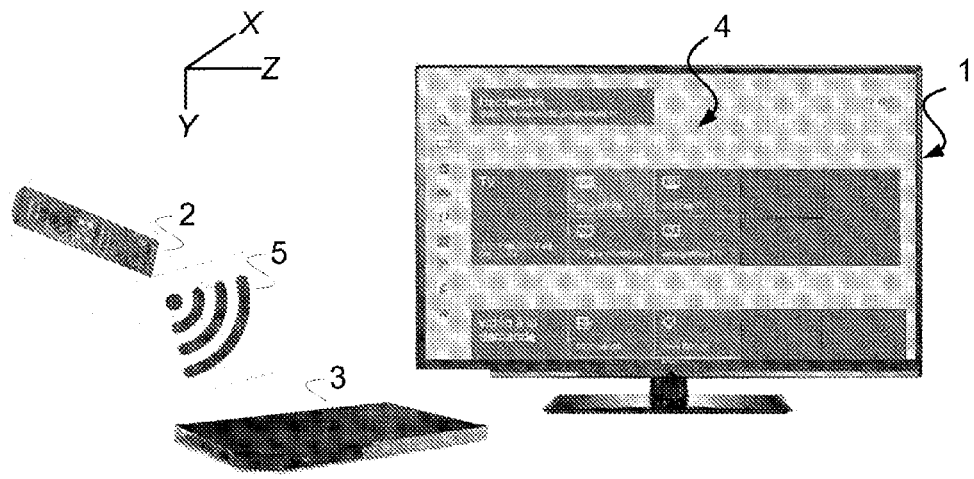
FIG. 1 represents a general context of implementation of an embodiment of the invention.

FIG. 1 represents a general context of implementation of an embodiment of the invention.

According to this example, the processing device is included in a multimedia content reception and decoding device (3), that will hereinafter be called "Set-Top-Box" or "STB". The STB (3) is conventionally connected to a network via a service gateway (not represented). The device (3) is associated with a remote control (2) capable of controlling it remotely, and thereby controlling the rendering device, or television (1), which is connected to it, comprising a display screen (4) and loudspeakers for the rendering of the multimedia contents.

The STB (3) conventionally incorporates presentation means for the different channels, access to these channels and "zapping" (that is to say navigating from one channel to another). It also incorporates means for accessing multimedia contents, for example via a communication port for receiving data from an operator (not represented) via the communication network (not represented). It also has a communication port in order to send commands to the television (1), for rendering data, called data to be rendered, which can be images, sound or video, or even, as represented in FIG. 1, data of a graphical interface, also called human-machine interface (HMI) of the menu of functionalities of the set-top box. This interface can be accessible from a television service server, from a video-on-demand (VOD) service server, from a web server, from a storage device on the local area network, etc. The interface (HMI) for selecting a TV programme comprises, as is known, an electronic TV programme guide (EPG) making it possible to access a schedule of the programmes of different television channels and to select a television programme to be rendered. Following the selection of a programme by a user and a command from the user to play this programme on the rendering device, the set-top-box is arranged to transmit to the television 1 a command to render the streamer.

According to a first embodiment, the set-top-box 3 is associated with the remote control 2 which is used to navigate in the menu of the set-top-box and to interact with it. The remote control comprises navigation keys (programme number, arrows, select "OK", etc.) to interact with the set-top-box, and a motion detection unit (accelerometer, gyroscope, etc.). According to this embodiment, the remote control has two modes of operation: in its first mode of operation, the remote control operates according to a typical remote control use: it communicates unidirectionally with the set-top-box and transmits commands according to keys pressed by the user, or commands entered via a touch screen of the remote control if it has one; in a second mode of operation, the remote control transmits to the set-top-box motion information via its motion detection module. This second mode of operation, which is the subject of the invention, can for example be triggered by a cooperation between the remote control and the set-top-box. In one example, the cooperation is a pairing of the remote control with the set-top-box via a short-distance communication channel, such as, for example, a Bluetooth, WiFi or other communication channel. According to another example, the selection of a predefined button of the remote control, or a particular motion, can trigger this mode. This second mode of operation of the remote control can in particular be used to navigate naturally in the HMI, as explained previously, or, more generally, to interact with data rendered on the screen by communicating to them the motion of the remote control.

According to a second embodiment, the set-top-box 3 is associated with a camera (not represented) which is used to capture the motions of the user (in particular of his or her hand) and transmit this information to the processing unit. The camera is associated in this case with the control unit, the role of which is to analyze the perceived motions of the user and transform them into motion information that is intelligible to the processing unit. This second mode can in particular be used to navigate naturally in the HMI, as explained previously, or, more generally, to interact with the data rendered by communicating to them the motion of the user.

Other exemplary embodiments can be envisaged.

According to another example, the television is linked to an electronic key capable of connecting to the local area network of the user. Such a key acts as the STB described above. It is driven by a remote control which is specific to it, or by a smartphone of the user, which then acts as the remote control.

Figure 2:
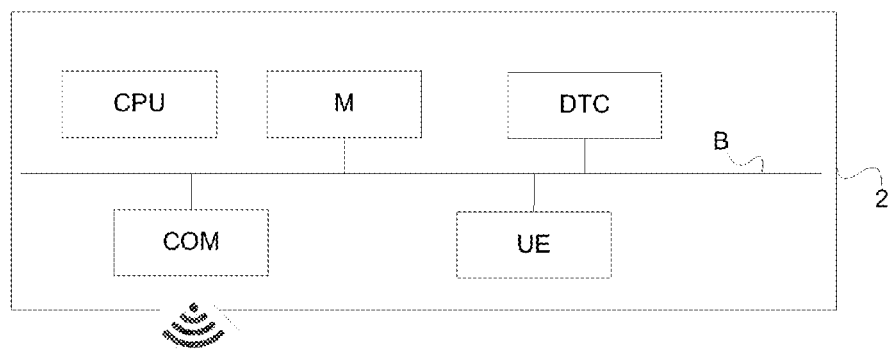
FIG. 2 represents a hardware architecture of a remote control device according to an embodiment of the invention.

FIG. 2 represents a hardware architecture of a remote control device (2), or remote control, according to an embodiment of the invention.

The device (2) comprises, conventionally, memories M articulated around the processor CPU. The memories can be of ROM (Read-Only Memory) or RAM (Random Access Memory) type, removable or fixed, etc. The random access memory makes it possible to temporarily store computation data used in the implementation of a method according to the embodiments. The non-volatile memory (for example of EEPROM type) makes it possible to store, for example, a computer program according to an embodiment for its execution by a processor. It communicates with the processing device (3) via a wireless communication module (COM) over a radio channel which can, for example, be of Wi-Fi, Bluetooth (BT), Zigbee type, an infrared channel, etc. As described previously in support of FIG. 1, a point-to-point communication channel (SP) is established according to this example between the two devices (2) and (3). Furthermore, the terminal comprises an input unit (UE), such as, for example, a key pad (not represented) for receiving commands from a user.

It also comprises a detection unit (DTC) capable of detecting a motion in space of the remote control device. It is preferably an accelerometer. The accelerometer measures the acceleration and the direction of acceleration when the motion occurs, that is to say when the user performs a motion with acceleration of the remote control. The accelerometer generates as output a set of parameters corresponding to the characteristics of the motion of the user of the control device. As a variant however, it can be a gyroscope (angular speed sensor). It can also be one or more cameras capable of detecting the motion of (the hand of) the user in space.

All these modules communicate conventionally with one another via a data bus (B).

Figure 3:
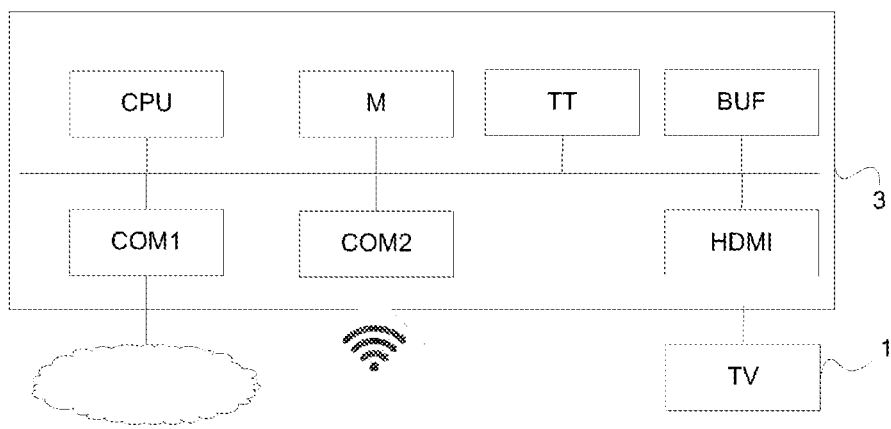
FIG. 3 represents a hardware architecture of a processing device according to an embodiment of the invention.

FIG. 3 schematically represents a rendering device (3) including a processing device according to the invention, capable of processing data for the rendering thereof on a rendering device.

The device 3 comprises, according to this example, a memory unit (M). This memory unit comprises a random access memory for temporarily storing computation data used in the implementation of a process according to the embodiment. The memory unit also comprises a non-volatile memory (for example of EEPROM type) for storing, for example, a computer program according to an embodiment for the execution thereof by a processor (CPU of the device. The device also comprises:

a first communication unit (COM1) for communicating over an external network (local area or wide area, of Internet type, DVB, etc.) in order to receive the data to be rendered on the rendering device with which it is associated;

a second communication unit (COM2) for receiving commands and data from the control device, in particular motion and selection information. According to one embodiment of the invention, the control device is a remote control and the information is obtained via a wireless channel and a radio interface. According to another embodiment, the control device is associated with one or more cameras and the information is obtained via any type of link, wired or wireless.

A third communication unit (HDMI) for communicating with a rendering device, typically, according to the embodiment presented in FIG. 1, a television (1), for rendering on its screen, for example, images, video or a graphical interface, and sound information. This communication unit is linked to a buffer (BUF) which contains the data to be rendered. Alternatively, this buffer can be situated outside the device, for example in the cloud.

Furthermore, the rendering device comprises a processing unit, or processing device (TT) for processing the data according to the invention. The processing unit receives as input motion and selection information from the control device, and generates as output the data to be rendered for the rendering device, stored in this embodiment in the buffer BUF before being transmitted for rendering over the HDMI interface.

FIG. 4 graphically illustrates an example of use of the motion on the display according to an embodiment of the invention.

It represents an EPG comprising a certain quantity of programme information (a programme schedule).

The arrow F1 schematically represents a first motion received from the control device, for example the remote control, and processed by the processing device. If the motion obtained indicates a downward translation, the processing device performs a translation, that is to say a downward scrolling of the menu.

The arrow F2 schematically represents a second motion received from the control device. If the motion obtained indicates a translation to the right, the processing device performs a translation of the menu, that is to say a scrolling to the right, or a programme selection (for example, in a predefined manner, the programme which is located in the middle of the screen).

The user can string together the two motions, the second motion terminating the first.

FIG. 5 illustrates a flow diagram of the different steps of the method according to an embodiment of the invention.

In a step E0, the user conventionally makes a selection via his or her remote control to enter into the "menu" mode which allows the set top box to display the programme guide (EPG). For example, he or she switches on his or her television and his or her set top box (in which case the menu is automatically displayed), or even he or she presses the "menu" button on his or her remote control. This message is received by the set top box in a corresponding step E10. The menu is displayed on the screen of the television.

In an optional step E1, the user selects entry into the "motion" mode according to the invention, for example by pressing a button on his or her remote control or performing a predetermined gesture.

In a step E2, the user moves his or her remote control, freely, without pointing or selection. The motion is detected by the motion detection module of the remote control (accelerometer, gyroscope, etc.) which generates, in a successive step E3, the motion information to be transmitted to the processing device.

In a step E4, the motion information (MVT) is transmitted to the processing device. The message conveying this information can take any form known to the person skilled in the art.

The motion information is received then analyzed by the processing module associated with the set top box during a step E11. During a successive step E12, the set top box takes an action following the detected motion. For example, it prepares the downward scrolling of the screen if the remote control has undergone a downward translational motion, preferably taking into account the speed and the acceleration of the motion. To this end, it prepares (in the buffer BUF) the data to be displayed on the screen in a step E13, then transmits them to the rendering device (screen of the television) for example via the HDMI port. Alternatively, it transmits only a command to the CPU of the rendering device by indicating to it the motion to be reproduced for the rendering of the data.

A test is performed in a step E14, in order to check whether the user has selected a programme or an application in the EPG, for example by pressing the OK button, or by changing the motion (switching from a downward motion to a horizontal motion). In the affirmative, a command is issued in the step E15 in order to select the corresponding programme, for example a TV channel, or a VOD service, music, etc.

It will be noted that the item (list, button, image, etc.) corresponding to the programme is not pointed to. However, a position can be chosen by default as starting point for the rendering of the display: when the user stops his or her motion, modifies it, changes motion or presses on a key, the programme corresponding to the default rendering position can be selected. If a programme schedule is considered, the programme for which the representative item is located displayed in the middle of the screen can for example be chosen by default.

In the course of viewing, in the step E15, the same steps as described previously can be strung together. For example if an interactive programme is being viewed, the remote control can be used in the same way to move the display comprising objects, lists, menus, insets, etc. In the case of a natural video (for example multiview), the remote control can be used to subject the video to translations, rotations, etc.

When the viewing of the programme is terminated in the step E16, the user generally returns to the menu, and the steps can be strung together once again from the steps E10 and E0.

It goes without saying that the embodiment which has been described above has been given in a purely indicative and nonlimiting manner, and that many modifications can easily be made by the person skilled in the art without in any way departing from the scope of the invention.

In particular, a motion of the remote control (first or second motion) can lead to an audio rendering action (increasing the volume, etc.).

The invention claimed is:

1. A processing method for a processing device associated with a rendering device, said processing device being driven by a control device and being capable of controlling a rendering of user interface data on a user interface of the rendering device, said user interface being capable of scrolling horizontally and/or vertically, the method comprising, on the processing device, acts of:

operating the processing device in a first mode corresponding to a standard remote control by the control device in which the processing device receives commands from the control device;
receiving user interface data to be rendered on the rendering device;
switching operation of the processing device to a second mode corresponding to a free navigation in the user interface, wherein switching to the second mode is triggered by a pairing of the control device with the processing device via a short-distance communication channel;
in the second operating mode:
obtaining motion information from the control device; and
controlling a scrolling of the data to be rendered as a function of the motion information received, independently of a pointing action.

2. The processing method as claimed in claim 1, wherein the control device is a remote control communicating with the processing device via a wireless link.

3. The processing method as claimed in claim 1, wherein the control device comprises at least one camera capable of recording the motions of a user, and the processing device obtains the motion information, which is derived from the motion recordings.

4. The processing method as claimed in claim 1, wherein: the motion comprises a translation.

5. The processing method as claimed in claim 1, wherein the data to be rendered are video data and the control is a control of scrolling of the rendered video data.

6. The processing method as claimed in claim 1 wherein the obtaining of the motion comprises:
obtaining a first motion in a first direction;
obtaining a second successive motion in a second direction different from the first, and wherein the method further comprises modification of the processing when the second motion is detected.

7. A processing device associated with a rendering device, the processing device comprising:
a processor; and
a non-transitory computer-readable medium comprising instructions stored thereon which when executed by the processor configure the processing device to perform acts comprising:
operating the processing device in a first mode corresponding to a standard remote control by a control device in which the processing device receives commands from the control device;
receiving user interface data of a user interface to be rendered on the rendering device;
switching operation of the processing device to a second mode corresponding to a free navigation in the user interface, wherein switching to the second mode is triggered by a pairing of the control device with the processing device via a short-distance communication channel;
in the second operating mode:
receiving motion information from a control device; and
processing said information and rendering said user interface data to be rendered on the rendering device and controlling scrolling of the data as a function of the motion information received, independently of a pointing action.

8. A control device capable of supplying motion information for a processing device associated with a rendering device, the control device comprising:
- a processor; and
- a non-transitory computer-readable medium comprising instructions stored thereon which when executed by the processor configure the control device to perform acts comprising:
  - operating the control device in a first mode corresponding to a standard remote control in which the control device transmits commands to the processing device;
  - switching operation of the control device to a second mode corresponding to a free navigation in the user interface, wherein switching to the second mode is triggered by a pairing of the control device with the processing device via a short-distance communication channel;
  - in the second operating mode:
    - detecting motion information from the control device; and
    - transmitting the motion information to the processing device.

9. A non-transitory computer-readable medium comprising a computer program stored thereon, which comprises code instructions for implementing a processing method, when the instructions are executed by a processor of a processing device, wherein the processing device is associated with a rendering device, said processing device being driven by a control device and being capable of controlling a rendering of user interface data on a user interface of the rendering device, said user interface being capable of scrolling horizontally and/or vertically, and wherein the instructions comprise:
- instructions that configure the processing device to operate the processing device in a first mode corresponding to a standard remote control by the control device in which the processing device receives commands from the control device;
- instructions that configure the processing device to receive user interface data to be rendered on the rendering device;
- instructions that configure the processing device to switch operation to a second mode corresponding to a free navigation in the user interface, wherein switching to the second mode is triggered by a pairing of the control device with the processing device via a short-distance communication channel;
- instructions that configure the processing device to, in the second operating mode:
  - obtain motion information from the control device; and
  - control a scrolling of the data to be rendered as a function of the motion information received, independently of a pointing action.

* * * * *